June 3, 1947.    J. S. HASBROUCK    2,421,501
FLUID COUPLING OUTLET VALVE THERMOSTATIC CONTROL
Filed Aug. 28, 1943

INVENTOR
*John S. Hasbrouck*
BY *Charles L. Shelton*
ATTORNEY.

Patented June 3, 1947

2,421,501

UNITED STATES PATENT OFFICE 2,421,501

FLUID COUPLING OUTLET VALVE THERMOSTATIC CONTROL

John S. Hasbrouck, Glastonbury, Conn., assignor to United Aircraft Corporation, East Hartford, Conn., a corporation of Delaware Application August 28, 1943, Serial No. 500,368

1 Claim. (Cl. 60—54)

This invention relates to an improvement in a fluid coupling temperature controlling apparatus, of an abandoned type disclosed and claimed in the application of Philip P. Newcomb, entitled Temperature control for fluid couplings, Serial Number 500,369, filed August 28, 1943, and assigned to applicant's assignee.

An object of this invention is to provide an improved and simplified thermostatically operated device for controlling the rate of flow of working fluid through a fluid coupling.

A further object of this invention is to provide a temperature responsive valve adapted to be secured to a fluid coupling and rotated therewith, and which will not be deleteriously affected in its operation by centrifugal force exerted thereon by rotation of the coupling.

Other objects and advantages will be apparent from the specification and claim, and from the accompanying drawing which illustrates what is now considered to be a preferred embodiment of the invention.

Figure 1:
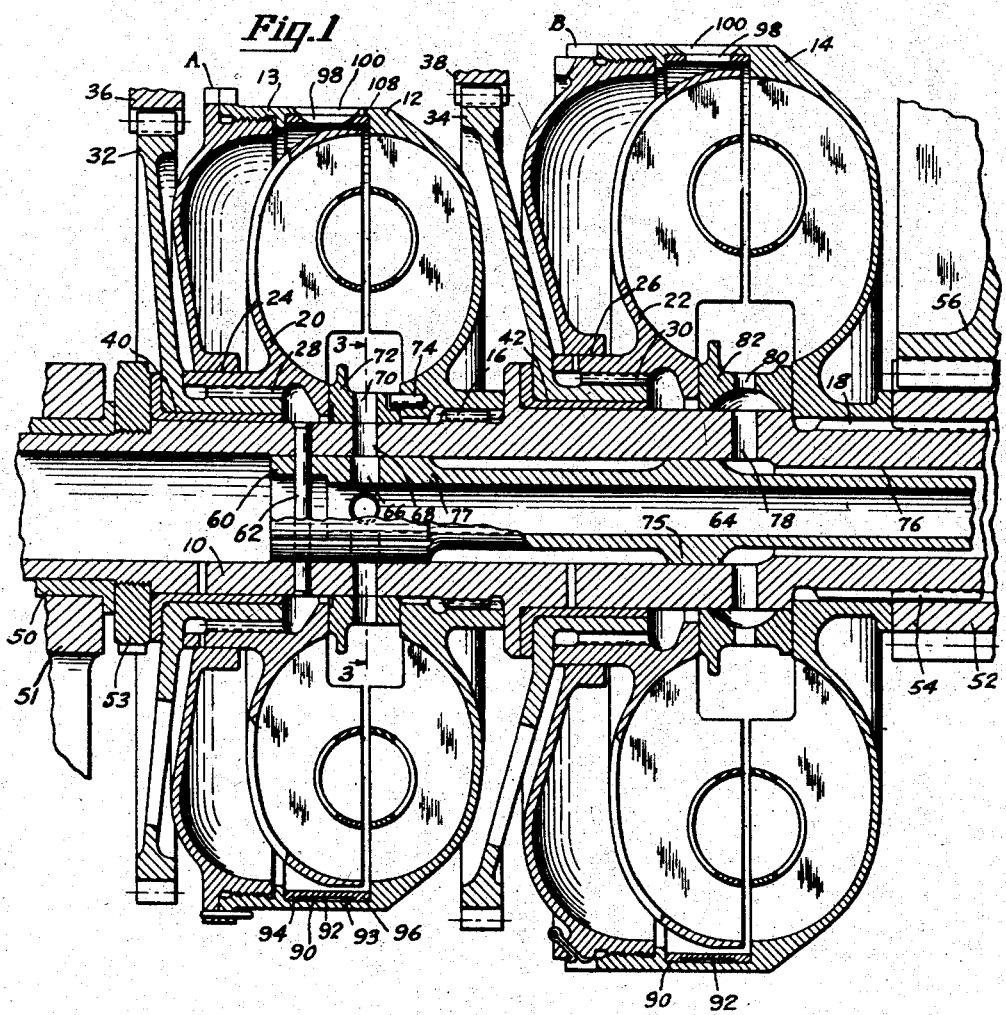
Fig. 1 is a cross-sectional view of a portion of a gear transmission which incorporates a pair of fluid couplings, each of which is provided with the thermostatic valve of this invention.
Figure 2:
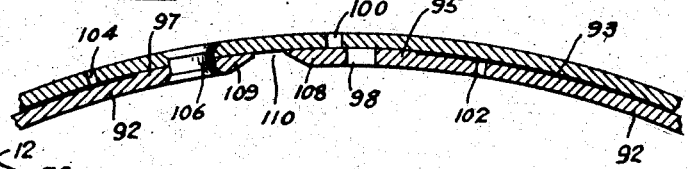
Fig. 2 is a detail view of the end portions of the thermostatic strip shown in Fig. 1.
Figure 3:
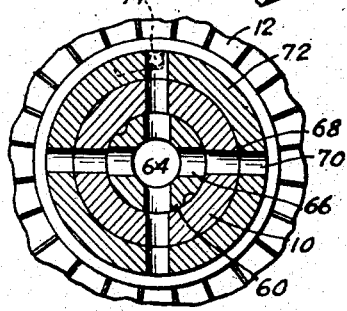
Fig. 3 is a section along the line 3—3 of Fig. 1.

Referring to the drawing, a shaft 10 has the driving elements 12 and 14 of hydraulic couplings A and B splined thereto at 16 and 18, respectively. Driven elements 20 and 22 of the couplings A and B are journaled within the respective driving elements at 24 and 26 and are splined at 28, 30 to driven gears 32, 34 which mesh with other gears, portions of which are shown at 36, 38. The driven gears are rotatably mounted on the shaft by bearings 40, 42; consequently the driven coupling elements 20 and 22 are rotatable with respect to shaft 10, while driving elements 12, 14 are fixed to the shaft, and are rotated thereby.

The shaft may be mounted in bearings, one of which is shown at 50, in a support 51. A nut 53 acts to restrain the various parts against longitudinal movement. Power is supplied to the shaft by a pinion 52 splined to shaft 10 at 54 and meshing with a driving gear 56. Shaft 10 may drive in either of the two gear ratios shown by selectively engaging either coupling A or coupling B, by filling or partially filling one or the other of said couplings with a working fluid, such as engine lubricating oil. By varying the amount of filling the slip of the particular coupling which is driving may be varied to infinitely vary the speed of gears 36, 38, relative to pinion 52, throughout the speed range from zero speed to the maximum speed provided by the higher speed gear ratio and coupling, at minimum coupling slip.

For introducing working fluid individually to each coupling a conduit 60 is secured by a pin 62 within shaft 10. Conduit 60 is provided with a bore 64 into which oil is admitted by a means such as a valved supply line (not shown). From bore 64 oil passes through openings 66, 68 in the conduit and shaft and into the low speed coupling A through port 70 in ring valve 72. As is fully disclosed and described in the application of A. V. D. Willgoos and L. S. Hobbs, entitled Infinitely variable blower drive, Serial Number 492,423, filed June 26, 1943, now Patent No. 2,400,307, and assigned to applicant's assignee, the oil admitting valve 72 may be secured with lost-motion (angularly) to the driven element of the coupling by a pin 74, so as to provide for rotation of valve 72 relative to driven element 12 and shaft 10 sufficiently far to mask port 68 and cut-off the supply of oil to the low speed coupling when the high speed coupling is engaged and takes over the drive of shaft 10.

Conduit 60 is spaced from the interior surface of shaft 10 by lands 75, 77 and forms with the hollow shaft an annular passage 76 into which oil may be introduced in any convenient manner. Land 75, bearing against the inner surface of the shaft, closes one end of the annular passage. Oil from passage 76 is admitted to the high speed coupling B through port 78 in shaft 10 and port 80 in a spacer ring member 82, which fits between opposed end faces on the driving and driven coupling members.

Oil may be supplied to the couplings individually simply by providing valve means or flow controlling means in the supply lines respectively associated with the passages 64 and 76. Or the coupling arrangement here shown may be provided with an apparatus for feeding oil to either passage 64 or passage 76, or to both said passages simultaneously, with a ring valve (such as shown at 72) acting to automatically disengage the non-driving coupling. Such an apparatus is disclosed and claimed in the Hobbs-Willgoos patent referred to above.

Each coupling is provided with a flow controlling means for varying the quantity of oil passing through each coupling in accordance with the temperature of the working fluid therein. As this means is the same in both couplings shown, it will be described in connection with coupling A only.

An annular recess 90 is formed in the inner surface of the outer wall of the coupling housing 13, which in this instance is a part of driving element 12. A flow controlling strip 92, extending almost entirely around the coupling, is fitted with a light snap fit in this recess and has a hollowed out portion bounded by side flanges 94, 96 extending along its length to form with the surface of recess 90 a passage 93. This passage is blocked off at each end of the strip 92 by full thickness portions 95, 97 at the ends 108, 109 of the strip. In other words, the hollowed out portion 93 does not extend the full length of the strip but terminates at points spaced from the ends of the strip. An opening 102 connects one end of passage 93 with the interior of the coupling and provides for a continuous flow of oil out of the coupling by way of opening 102, passage 93, and an outlet 104 through the coupling wall at the other end of passage 93. Thus oil continuously flows out of the coupling during its operation through opening 102, passage 93, and outlet 104, by the action of centrifugal force developed on the oil by rotation of the coupling. Centrifugal force developed during coupling operation will tend to press strip 92 tighter against the bottom of recess 90 but the force exerted by the pressure of the oil within the coupling on the strip will be partially balanced by the pressure of the oil draining through the passage 93. These factors may be utilized in the design of the device to provide a tight, sealing fit between the strip ends 95, 97, the lands 94, 96, and the surfaces of the recess, without unduly restricting the freedom of movement between the strip, longitudinally thereof, and the coupling. The continuous flow of oil through passage 93 inhibits the collection of dirt or sludge between the strip and the housing and thus prevents "freezing" or sticking of the strip in the recess 90.

Strip 92 has one end 109 riveted at 106 (or otherwise secured) to the coupling housing. Its other end 108 is free. The strip is made of a material having a coefficient of temperature expansion different from that of the material of the housing and consequently there will be relative movement along the length of the strip between the strip and the housing whenever the temperature of the two members changes. This relative movement is utilized to control the flow of oil through an additional oil drain port 100 in the coupling well. The free end 108 of the flow controlling member is formed with an opening 98 which matches with slot or port 100 to provide full flow therethrough at a predetermined temperature of the oil in the coupling. This predetermined temperature is preferably greater than the maximum temperature to which it is desired that the coupling oil be subjected, and therefore the port 100 and opening 98 will be offset or mismatched under normal operating conditions to restrict the flow of oil through drain 100. The amount of such restriction varies with the movement of the strip, becoming less as the temperature of the oil increases. Thus an increase in temperature of the working oil will result in a movement of strip 92 relative to the housing and will increase the amount of oil draining from the coupling.

Preferably, the housing of the coupling is made of steel, while the strip member is made of aluminum or magnesium. With such an arrangement, the light metal member elongates further than does the housing, in a circumferential direction, when the temperature of the two members increases. Because the member is contacted by the working fluid on both sides thereof, over practically its entire surface area, it will at all times be at substantially the same temperature as the working fluid. The housing will also vary in temperature with changes in the temperature of the working fluid; however, the housing is of greater mass than the strip and is contacted over only a part of its total surface by the oil in the coupling and therefore will not respond quickly to rapid temperature changes in the working oil, as will the strip member 92. Thus a rapid change in oil temperature will create a temperature difference between the flow controlling member 92 and the coupling, in a direction to relatively quickly increase the oil flow through port 100 for an oil temperature increase and to decrease the oil flow for an oil temperature decrease. Slower changes in oil temperature will cause relatively slow changes in the restriction of port 100, caused mainly by the difference in the expansion coefficients of strip 92 and housing 13.

In operation, power loss in the driving coupling due to coupling slip will create heat in the oil in the coupling working chamber. If the normal flow of oil through the coupling, by way of passage 93 and drain 104, is not sufficient to carry off the heat generated then the temperature of the oil will increase. This will cause differential expansion of strip 92 and the coupling housing and will decrease the restriction of port 100 to increase the total quantity of oil drained through ports 104 and 100, until the rate of flow of oil out of the coupling is sufficient to carry away the heat generated in the coupling and prevent a further increase in the oil temperature. Thus, the amount of oil drained from the coupling is thermostatically varied to maintain the temperature of the oil within the coupling below a predetermined limit. If the oil is passed through the couplings in a closed circuit, as it preferably is, then the oil drained from ports 104, 100 is collected in a sump and pumped through an oil cooler before being returned to the coupling. The quantity of oil admitted to the coupling is varied in relation to the total quantity drained through ports 104, 100, for the purpose of controlling the slip of the coupling by varying the amount of oil retained in the working chamber, as is fully described in the Newcomb application referred to above.

The construction lends itself to a design in which the mass of the temperature controlling strip is uniformly distributed around the coupling, and hence does not adversely affect the balance thereof. Large centrifugal forces caused by high speed rotation of the coupling will not hinder operation of the thermostatic member but merely hold it tighter against the housing which prevents leakage except through the openings 98 and 102.

It is to be understood that the invention is not limited to the specific embodiment herein illustrated and described, but may be used in other ways without departure from its spirit as defined by the following claim.

I claim:

In an apparatus for controlling the temperature of the fluid in the working chamber of a fluid coupling, a thermostatic element carried by a rotatable wall of said coupling, means forming a fluid passage between said element and said wall substantially surrounding the axis of rotation of said coupling, an opening in said element adjacent one end of said passage for admitting fluid thereto from the working chamber of said coupling, an opening in said wall adjacent the other end of said passage for draining said fluid from said passage, and means controlled by said element for draining additional fluid from said chamber in amounts which vary in accordance with variations in the temperature of said element.

JOHN S. HASBROUCK.

REFERENCES CITED

The following references are of record in the file of this patent:

UNITED STATES PATENTS

| Number | Name | Date |
| --- | --- | --- |
| 2,144,596 | Daiber | Jan. 17, 1939 |
| 2,151,075 | Berger | Mar. 21, 1939 |
| 2,255,877 | Dalen | Sept. 16, 1941 |
| 857,452 | Farmer | June 18, 1907 |

FOREIGN PATENTS

| Number | Country | Date |
| --- | --- | --- |
| 375,750 | Italy | 1939 |